MODEL INDICATOR FOR AIRCRAFT MOVEMENT
Filed Feb. 14, 1963 4 Sheets-Sheet 1
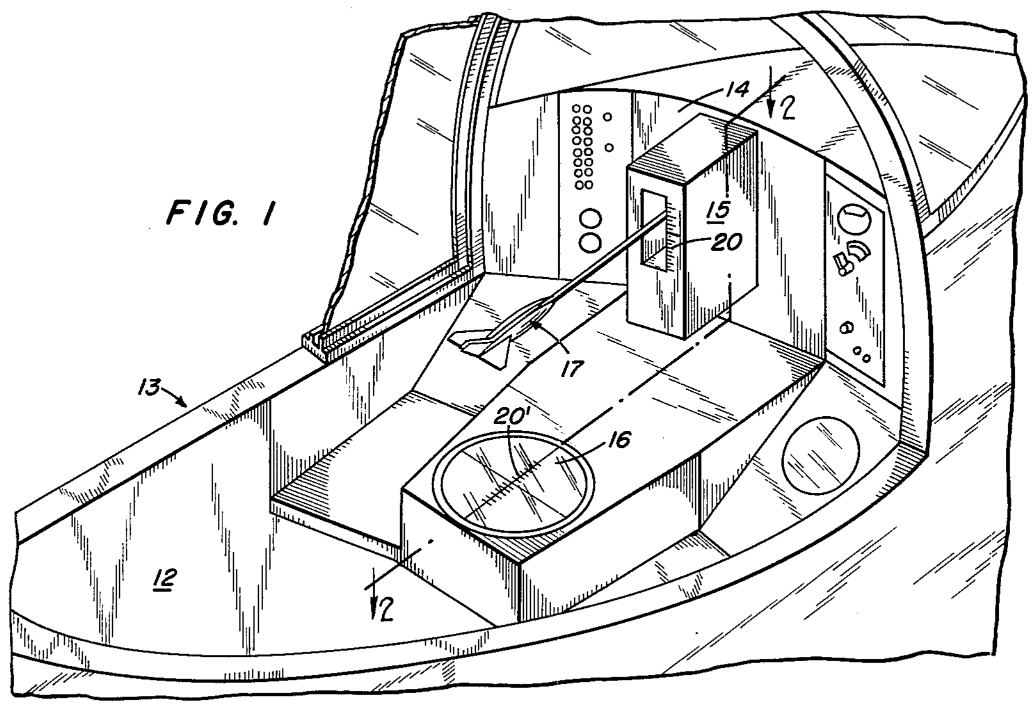
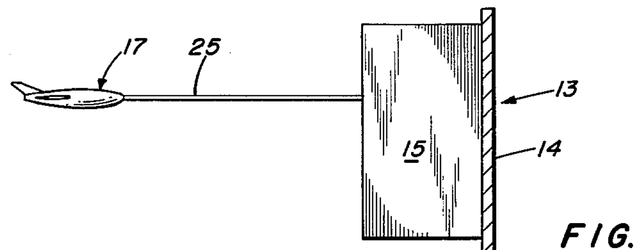
FIG. 2
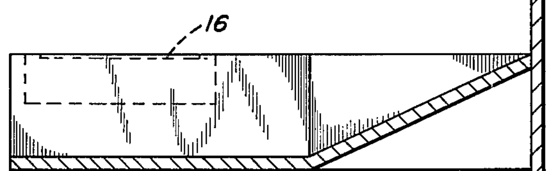
INVENTOR
ARTHUR D. STRUBLE, JR.
BY Claude Funkhouser
ATTORNEY Dec. 28, 1965 A. D. STRUBLE, JR 3,225,594

MODEL INDICATOR FOR AIRCRAFT MOVEMENT

Filed Feb. 14, 1963 4 Sheets-Sheet 2

MODEL INDICATOR FOR AIRCRAFT MOVEMENT

Filed Feb. 14, 1963 4 Sheets-Sheet 3

Dec. 28, 1965 A. D. STRUBLE, JR 3,225,594

MODEL INDICATOR FOR AIRCRAFT MOVEMENT

Filed Feb. 14, 1963 4 Sheets-Sheet 4

United States Patent Office 3,225,594

Patented Dec. 28, 1965

3,225,594
MODEL INDICATOR FOR AIRCRAFT MOVEMENT

Arthur D. Struble, Jr., 2101 Rosita Place, Palos Verdes Estates, Calif.

Filed Feb. 14, 1963, Ser. No. 258,974
6 Claims. (Cl. 73—178)
(Granted under Title 35, U.S. Code (1952), sec. 266)

The invention described herein may be manufactured and used by or for the Government of the United States of America for governmental purposes without the payment of any royalties thereon or therefor.

The present invention is a continuation in part of U.S. Application Serial No. 764,457, filed September 30, 1958, now abandoned, and relates to integrated cockpit instrumentation and data presentation apparatus. More particularly, the invention relates to integrated cockpits wherein information is presented in a manner to be easily comprehended by the pilot.

In any control problem, the sensing element must present its information to the operator in such form that the data received is sufficient to permit accomplishment of the desired magnitude of control. In situations wherein the pilot is the operator, it is necessary to acquaint him with the magnitude of the control required for proper compensation to accomplish or maintain a predetermined flight maneuver or altitude condition. Too little information may prove ineffectual and likewise, too much tends to confuse the operator. The multitude of indicators, as well as the wide variety of indications as provided in present day airplanes, represents an extremely complex position in data representation. The awesome spectacle of a modern instrument panel almost tends to create a mental block in the neophyte pilot. Also, those aviators entering that phase of aeronautics known as "instrument flying" are usually apprehensive of their ability to master the intricacies of "dial watching." Since the indicators are not truly pictorial, the pilot must read the indicator, transpose the numerical quantity indications into aircraft attitude and then correct the attitude of the aircraft so as to bring the associated indicators to a predetermined quantity.

The unremitting physiological and psychological pressures that tax the pilots of today's high-speed, high-performance aircraft leave a negligible amount of time for the pilot to react to the exigencies of the moment. It becomes imperative for the pilot to minimize the time required for him to accurately react to the instantaneous demands of his aircraft.

An object of the present invention is the provision of an instrument presentation system wherein mental correlation by the pilot of a plurality of indications provided by the instruments for flight of the aircraft is reduced to a minimum.

Another object is to provide a realistic conception of visual flying by presenting to the pilot a three dimensional flight presentation.

A further object of the invention is the provision of an integrated cockpit system whereby manual flight is performed using secondary vision while primary attention is given to other demanding operations.

A still further object of the invention is the provision of an indicating model airplane that will substantially follow the motions of the aircraft and move, in reference to a plane, through the motions of pitch, roll, vertical and longitudinal movement.

It is a still further object to provide an indicating model which will follow the motions of an aircraft through pitch, roll, vertical motion (showing altitude), and horizontal motion (showing velocity) either singly or in conjunction with any other or all motions.

Other objects and many of the attended advantages of this invention will be readily appreciated as the same becomes better understood by reference to the following detailed description when considered in connection with the accompanying drawings wherein:

FIG. 1 is a pictorial illustration of a typical cockpit incorporating the instant invention with the model airplane type indicating device mounted therein.

FIG. 2 is a sectional view taken along the plane 2—2 of FIG. 1.

Figure 3:
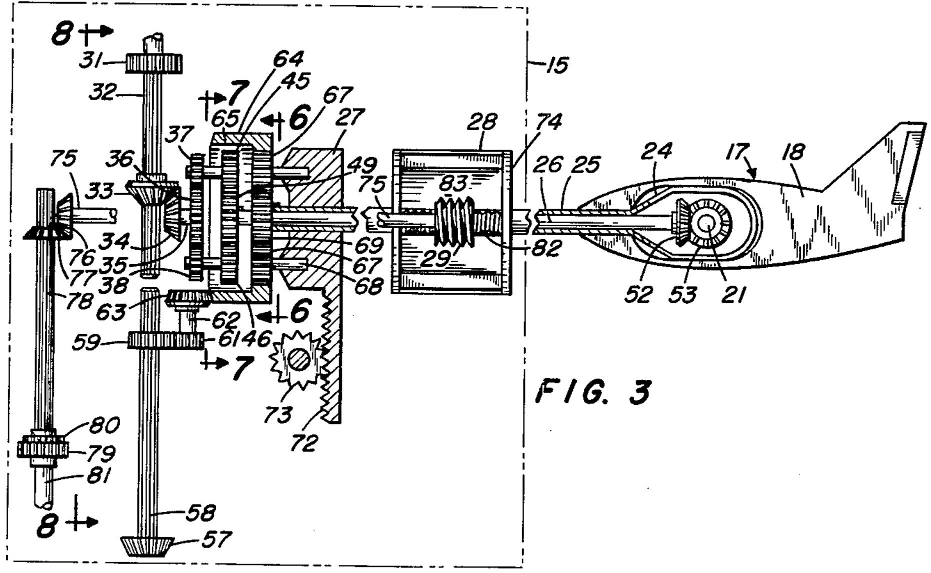
FIG. 3 is a diagrammatic representation of the mechanism for actuating the model.

Referring to the drawings wherein like reference characters designate like or similar parts throughout the several views, FIG. 1 illustrates the cockpit 12 of an aircraft 13 having a panel board 14 and a housing 15 to which the simulated model showing the embodiment of the invention is connected.

A plane surface 16 (stabilized with respect to the earth's surface) forms the base for mechanical structure which imparts movement to an indicating model plane 17 in accordance with 4 degrees of motion of the aircraft; namely, vertical movement, longitudinal movement of the model corresponding to relative ground speed of the aircraft and pitch and roll of the plane.

Figure 4:
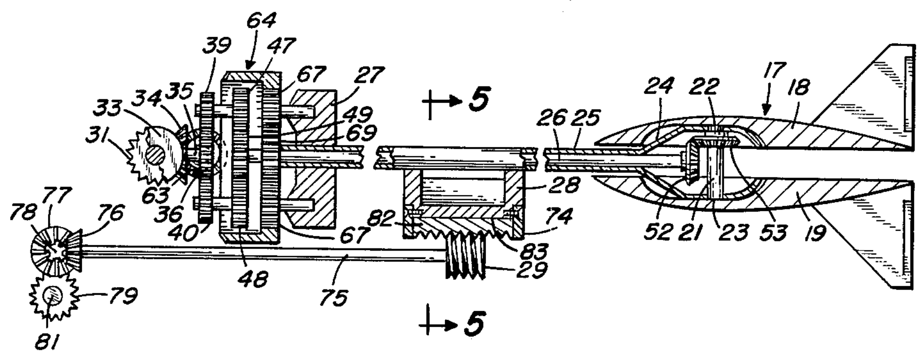
FIG. 4 is a top view taken at right angles to FIG. 3.

Referring particularly to FIGS. 3 and 4, the indicating model plane 17 is shown in two sections 18 and 19 connected by a shaft 21, the ends 22 and 23 of which are journaled in a yoke 24 and are securely fastened to their respective halves of the plane so that the plane may move about with the shaft 21 as an axis and move through 360° of rotation if desired, thereby simulating the pitch movement of the aircraft. A scale 20 may be used to provide an altitude reference correlative to that at which it is desirable for the aircraft to cruise. Visual reference to the position of the indicating model will give approximate position of the aircraft above or below this desired altitude. Also, a reference line with indicating scale 20' may be established on the plane surface to which the longitudinal movement of the indicating model may be compared, the reference point representing some desired speed and the longitudinal movement of the indicating model, the rate above or below this desired speed.

The yoke 24 journals the shaft 21 and extends to form the sleeve 25, the rotation of which about its longitudinal axis causes the indicating model to turn about its longitudinal axis, simulating roll of the aircraft 13.

The shaft 21 is turned by gearing mounted on the end of a rod 26 which is housed within the sleeve 25. Both the sleeve and the rod are connected to gearing hereinafter described in greater detail and together with the gearing are connected to a fixture 27 which moves in a vertical plane to move the model airplane in accordance with the altitude of the aircraft 13.

Secured to the sleeve 25 is a quadrant 28 which carries a slideably mounted wormwheel rack portion 82 which in turn is matingly engaged and driven by a worm 29, the shaft 75 of which is mounted from structure, not shown, which is fixed with respect to the plane 16 to give horizontal motion to the mechanism which has been previously described. These independent motions will now be described in detail.

*Pitch movement*

Figure 7:
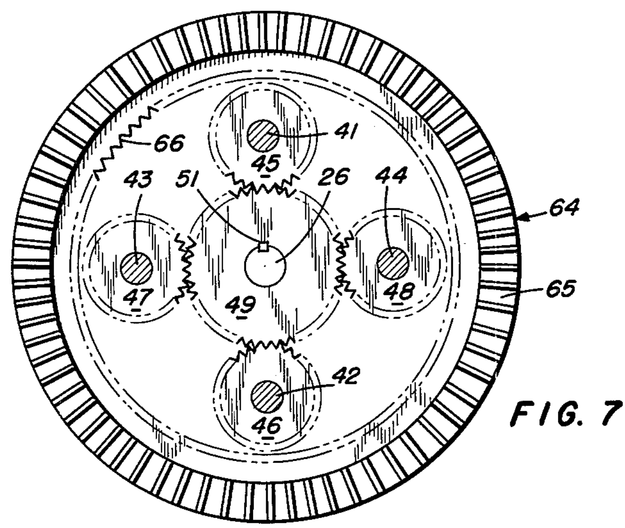
FIG. 7 is a sectional view along line 7—7 of FIG. 3.
Figure 8:
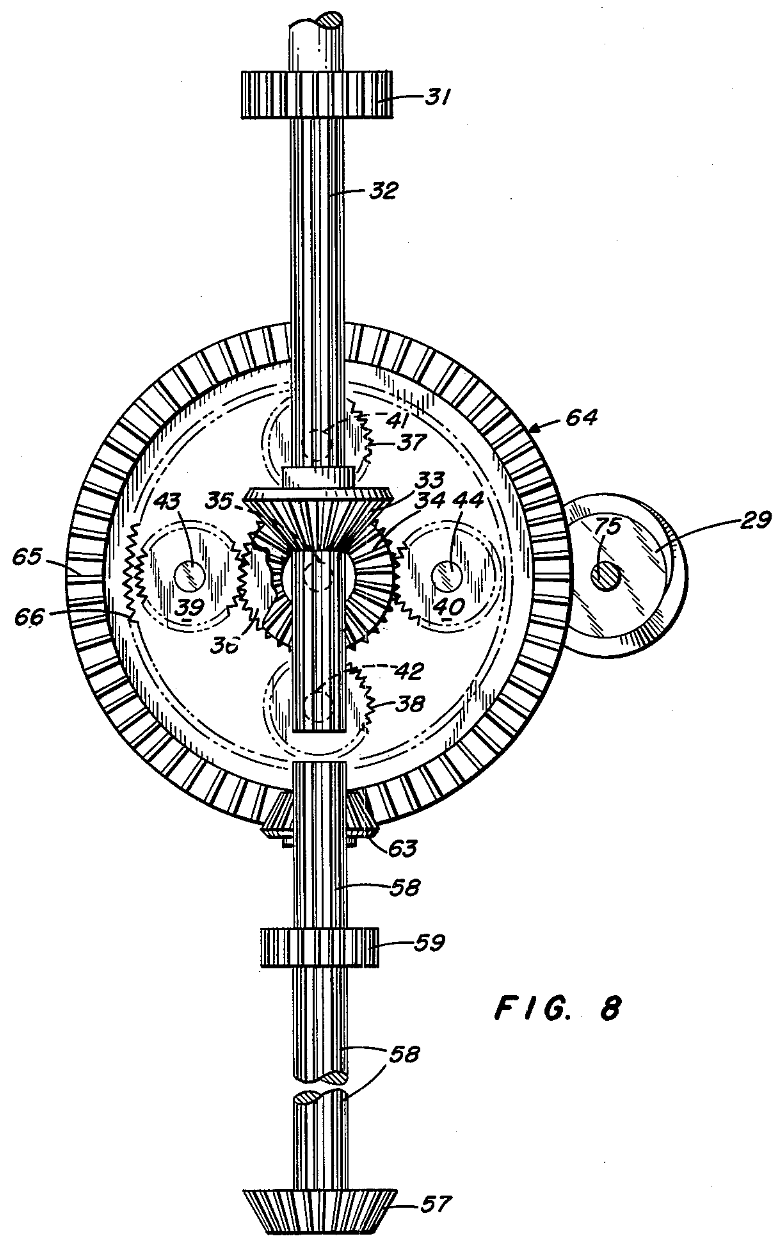
FIG. 8 is sectional view along line 8—8 of FIG. 3.

A gear 31 driven by a mechanical output, not shown, from a gyroscopically controlled instrument indicating the pitch of the plane is attached to a suitably journaled splined shaft 32 which has mounted thereon a bevel gear 33. The bevel gear 33 rotates with the shaft 32 and is permitted to have relative movement along the length of the shaft 32 while being rotated. This gear 33 meshes with a similar bevel gear 34 carried on a stub shaft 35 which also carries a pinion gear 36. The pinion gear 36 is the sun or central gear of four planetary pinion gears 37, 38, 39 and 40 which are fixed, respectively, on shafts 41, 42, 43 and 44. These shafts have fixed to their free ends similar pinion gears 45, 46, 47 and 48 which serve as planetary gears for a sun gear 49. The gear 49 is keyed to the shaft 26 by a key 51 (FIG. 7). The shaft 26 passes through the sleeve 25 and extends into the yoke 24 and has mounted on the end thereof a bevel gear 52. A similar bevel gear 53 is in mesh with gear 52 and is mounted on shaft 21. Movement of the gear 31 is thus transmitted through splined shaft 32, bevel gears 33 and 34, the stub shafts 35, through the planetary gearing system of gears 37, 38 and 45, 46, through the sun gear 49 and the keyed shaft 26 to drive bevel gear 52. Bevel gear 53 which is driven by bevel gear 52 turns the shaft 21 about its longitudinal axis and causes the shaft 21 which is attached to both halves of the model airplane 17 to move in accordance with the pitching movements of the aircraft.

*Roll movement*

Figure 6:
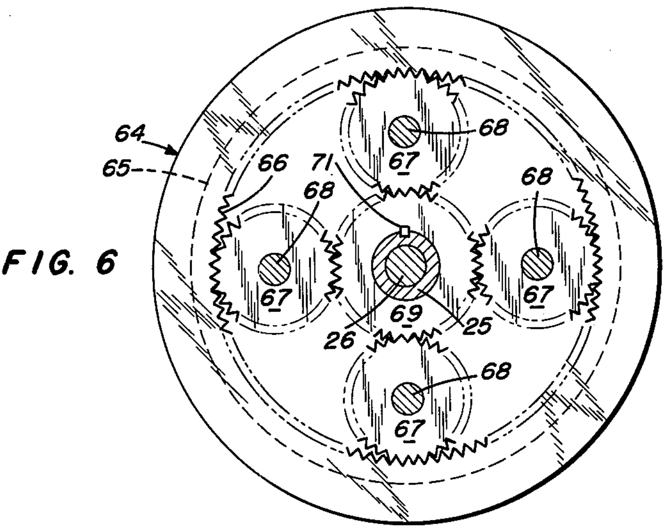
FIG. 6 is a sectional view taken along line 6—6 of FIG. 3.

A bevel gear 57 (FIG. 3) is connected to a gyroscopically controlled instrument, not shown, which provides a mechanical output of a rotational character indicating the roll of the aircraft 13. This gear 57 is mounted on the end of a splined shaft 58 which carries pinion gear 59 in mesh with pinion gear 61 carried on the end of stub shaft 62. The other end of the stub shaft 62 carries a bevel gear 63 which is in mesh with a ring bevel gear 64. The ring bevel gear 64 is formed with a cylindrical extension 65 and annular interior teeth 66 on a reduced diameter bore at the remote end thereof. A plurality of positionally fixed idler gears 67 are mounted on respective ones of the plurality of stub shafts 68 and are in mesh with the interior annular teeth 66 (FIG. 6) of the ring 64 and for cooperating with them to drive an output gear 69 which is keyed to the sleeve 25 by a key 71.

Roll movements of the aircraft 13 are transmitted by the aforementioned gyroscopically controlled instrument to the gear 57 through the splined shaft 58, gears 59 and 61, bevel gear 63, ring bevel gear 64, idler gears 67 and output gear 69 to the sleeve 25. The sleeve 25 (FIG. 6) is thus rotated about its longitudinal axis and thus producing a turning of the yoke 24 and its journal shaft 21. The two halves of the indicating model plane will turn about a longitudinal axis with the shaft 21 in accordance with the rolling movement of the aircraft 13.

*Vertical movement*

A pinion gear 73 which is connected to and controlled by altimeter output shaft, not shown, is in mesh with a rack 72 which is an integral part of fixture 27. The fixture 27 has mounted thereon stub shafts 68 which carry the idler gears 67, and vertical movement of the fixture moves the entire assembly of gears together with the sleeve and rod and indicating model plane in a vertical direction in accordance with movement imparted to the gear 73 by a suitable input mechanism. This small vertical movement is possible because of the relationship of the gear 59 with the splined shafts. It is to be understood that pinion gears 59 and 61 are maintained in meshing engagement by structure, not shown, at any position of pinion gear 59 along splined shaft 58. Rotational information applied through pinion 73 is transmitted to the indicating model airplane to cause it to move the model a vertical distance above or below the zero reference on scale 20 to indicate to the pilot the approximate altitude of the aircraft.

*Longitudinal movement*

Figure 5:
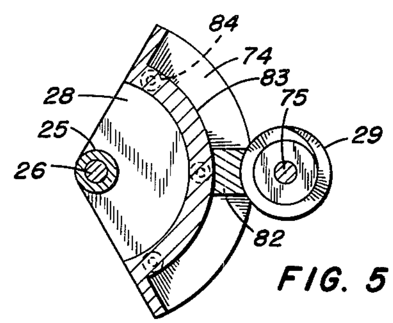
FIG. 5 is a sectional view taken along line 5—5 of FIG. 4.

Longitudinal movement of the model plane is in relation to the speed of the aircraft relative to the ground and functions similarly to the ordinary speedometer. The model plane moves longitudinally relative to an indicator mark on the plane surface to indicate approximate speed of the aircraft relative to the ground. Referring to FIGS. 3, 4 and 5, a shaft 81 driven by Selsym motor drive or some desirable aparatus of a character known in the art which provides an effect similar to the recording pointer of a speedometer, drives pinion gear 79 which is in mesh with pinion gear 80 on splined shaft 78. Shaft 78 carries bevel gear 77 which is in mesh and drives bevel gear 76 on shaft 75. Shaft 75 carries worm 29. The worm 29 is meshed with a nut section 82 which functions as a screw driven rack. Integral with sleeve 25 or welded thereto is a segment member 28 having a polished arcuate surface 83 on which the nut 82 is mounted in a sliding relationship which permits rotational oscillation of the sleeve 25 without disturbing the longitudinal positional relationship of nut 82 and worm 29. End plates 74 secured by screws 84 to the segment 28 hold the nut 82 in place and transfer the travel of the nut, when actuated by the worm, to the segment and to the sleeve 25 to move the entire assembly horizontally to effect movement of the model plane with reference to plane 16.

The movements of the indicating model which may be in one degree only, thus pitch, roll, vertical movement or longitudinal movement are transmitted along or in conjunction with any or all of the other motions. The pilot can at a glance obtain substantially the position and motion of his airplane with respect to the ground by observing the movements of the indicating model with respect to the plane surface.

What is claimed is:

1. An apparatus for actuating an indicating model airplane in accordance with the movements of an aircraft and in reference to a plane surface representative of the earth's surface, the model airplane and plane surface being carried by the aircraft, said aircraft having pitch operated mechanism, roll operated mechanism, a velocity measuring mechanism and an altitude measuring mechanism, said apparatus comprising:

means responsive to said pitch operated mechanism for transmitting the pitch movement of the aircraft to said indicating model for moving said model in pitch in relation to the plane surface;

means comprehensive of said pitch transmitting means, responsive to the roll operating mechanism for transmitting the roll movement of the aircraft to the indicating model for moving said model in roll in relation to the plane surface;

means comprehensive of both the roll transmitting means and the pitch transmitting means, responsive to said altitude measuring mechanism for transmitting to the indicating model a vertical movement in relation to said plane surface in accordance with the altitude; and means comprehensive of the pitch transmitting means, the roll transmitting means and the altitude transmitting means, responsive to the velocity measuring mechanism of the aircraft to move said indicating model in a longitudinal direction in accordance with the velocity and in relation to a particular marking on the plane surface, each of said movements of the indicating model being performed separately or in conjunction with any or all movements.

2. A slave indicating model airplane, according to claim 1 wherein the indicating model is two halves of a model plane, and means connecting said halves to permit both pitch indicating movements and roll indicating movements.

3. A slave indicating model airplane, according to claim 2 wherein the pitch transmitting means includes a shaft connected at each end to one half of the indicating model, respectively;

a bevel gear on said shaft to oscillate said shaft and the indicating model about the longitudinal axis of said shaft, and gearing and shaft mechanism connected to said bevel gear and said pitch operated mechanism to transmit motion from said pitch operated mechanism to said bevel gear.

4. A slave indicating model airplane according to claim 3 wherein the roll transmitting means includes a yoke journalling the indicating model connecting shaft;

a sleeve integral with and moving said yoke through an arc to turn the indicating model in a rolling motion in relation to said plane surface.

5. A slave indicating model airplane, according to claim 1 wherein the means imparting vertical movement to the indicating model includes a rack;

an integral fixture supporting both the pitch transmitting means, and the roll transmitting means;

a gear operated by said altitude measuring means connected to and moving said rack and fixture to move the indicating model vertically.

6. A slave indicating model airplane, according to claim 1 wherein the means for moving the indicating model in accordance with the velocity of the aircraft includes a worm driven proportionally to the velocity of the aircraft; and a threaded quadrant nut section connected to the indicating model and in engagement with said worm drive, rotation of said worm drive moving said quadrant section and said indicating model along the longitudinal axis of said indicating model a distance proportional to the velocity of the aircraft.

References Cited by the Examiner

UNITED STATES PATENTS

| | | | |
|---|---|---|---|
| 2,170,087 | 8/1939 | McPherson | 33—204 |
| 2,283,190 | 5/1942 | Crane | 33—204 |
| 2,424,570 | 7/1947 | Jenks | 78—178 X |
| 2,566,305 | 9/1951 | Beacon | 33—204.2 |
| 2,582,796 | 1/1952 | Reid | 73—178 X |
| 2,737,640 | 3/1956 | Barnaby | 73—178 X |
| 2,747,293 | 5/1956 | Lyons | 33—204.2 |
| 3,037,382 | 6/1962 | Aid et al. | 73—178 |
| 3,060,405 | 10/1962 | Buon | 73—178 X |

FOREIGN PATENTS

| | | |
|---|---|---|
| 513,787 | 10/1939 | Great Britain. |

LOUIS R. PRINCE, *Primary Examiner.*